United States Patent
Lee et al.

(10) Patent No.: US 9,988,157 B2
(45) Date of Patent: Jun. 5, 2018

(54) FAN COWL BALKING LATCH

(71) Applicant: Rohr, Inc., Chula Vista, CA (US)

(72) Inventors: John J. Lee, Thousand Oaks, CA (US);
Kristian Sitson, San Diego, CA (US);
Yibin Deng, Alhambra, CA (US)

(73) Assignee: ROHR, INC., Chula Vista, CA (US)

( * ) Notice: Subject to any disclaimer, the term of this patent is extended or adjusted under 35 U.S.C. 154(b) by 320 days.

(21) Appl. No.: 14/671,570

(22) Filed: Mar. 27, 2015

(65) Prior Publication Data

US 2016/0280383 A1   Sep. 29, 2016

(51) Int. Cl.
*F01D 25/24* (2006.01)
*B64D 29/06* (2006.01)
*B64D 29/08* (2006.01)

(52) U.S. Cl.
CPC ............. *B64D 29/06* (2013.01); *B64D 29/08* (2013.01)

(58) Field of Classification Search
CPC ........ F01D 25/24; F01D 25/28; F01D 25/243; F02C 7/20; F05D 2260/30
USPC ................. 415/126, 214.1; 244/118.2, 129.4
See application file for complete search history.

(56) References Cited

U.S. PATENT DOCUMENTS

| 6,755,448 B2* | 6/2004 | Jackson | B64D 29/06 244/110 B |
| 2012/0280082 A1* | 11/2012 | Calder | B64D 29/06 244/129.4 |
| 2015/0300061 A1* | 10/2015 | Fabre | E05C 19/145 292/113 |

* cited by examiner

*Primary Examiner* — Jason Shanske
*Assistant Examiner* — Jason Mikus
(74) *Attorney, Agent, or Firm* — Snell & Wilmer L.L.P.

(57) ABSTRACT

A nacelle may include fan cowl panels which may be opened to provide access to the fan case. A latching mechanism may latch a left fan cowl panel to a right fan cowl panel. The latch may create a separation between the fan cowl panels when unlatched. A shoot pin latch may be aligned with a receiver cavity such that the shoot pin latch may be closed when the latching mechanism is closed. If the fan cowl panels are not fully closed, the shoot pin latch may be prevented from closing, and a high visibility handle may indicate that the fan cowl panels are not latched together.

16 Claims, 7 Drawing Sheets

FAN COWL BALKING LATCH

FIELD

The disclosure generally relates to turbofan propulsion systems for aircraft. More particularly, the disclosure relates to latches for a fan cowl in a nacelle for a turbofan propulsion system.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a fan cowl which forms the outer portion of the nacelle in the area of the fan. The fan cowl typically has two halves which may hinge open to provide access to the fan case and any components mounted on it, which sometimes includes a lube oil sump and pump, the computer for controlling the engine, etc.

Latches have been used to latch the fan cowl halves to each other, but these existing latches suffer from various disadvantages or insufficiencies. For example, in the event that the latch is not manually engaged prior to aircraft takeoff, the fan cowl halves are not secured. The location of the latches may be obscured from quick visual inspection. Thus, it is possible for unlatched fan cowl halves to go unnoticed should the latches not be properly inspected, and an aircraft may takeoff with unlatched fan cowl halves. The fan cowl halves may separate from the nacelle during flight if the latches are not secured.

SUMMARY

An aircraft nacelle may comprise a first fan cowl panel rotatable about a first hinge and a second fan cowl panel rotatable about a second hinge, wherein the first fan cowl panel and the second fan cowl panel are rotatable between a closed position in which the first fan cowl panel and the second fan cowl panel form an exterior of the aircraft nacelle, and an open position in which the first fan cowl panel and the second fan cowl panel are separated. The aircraft nacelle may comprise a shoot pin latch mounted to the first fan cowl panel comprising a first handle and a shoot pin. A receiver may be coupled to an inlet of the nacelle. In the closed position, the shoot pin may be aligned with a receiver cavity in the receiver. The shoot pin latch may be configured to be closed by extending the shoot pin into the receiver cavity.

An aircraft nacelle may comprise a first fan cowl panel configured to move relative to the aircraft nacelle to provide access to a fan case, a latch configured to create a separation between the first fan cowl panel and a second fan cowl panel in response to the latch being unlatched, and a shoot pin latch coupled to the first fan cowl panel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for latching fan cowl panels are disclosed. Latches may be employed to close and secure fan cowl panels together for flight, and allow the panels to open to permit access to inspection points and to perform maintenance. A latch is preferable to a permanent mechanical attachment of the fan cowl panels because the fan cowl panels should be removable or openable by ground support personnel in order to reach the fan case for inspection and servicing.

A latch may be used which creates a separation between the fan cowl panels and the inlet when unlatched to signal the unlatched condition during an inspection. The latch may include a push pin. In response to the latch being opened, the push-pin may extend and force apart the fan cowl panels at the location of the latch at the bottom of the nacelle. The push pin may create a gap at the bottom of the nacelle between the fan cowl panels. The push pin may maintain this gap and keep the fan cowl panels in a partially hinged open state so long as the latch is open. A shoot pin latch may be located on an outboard portion of the fan cowl, for example at the 3 o'clock and/or the 9 o'clock positions. The shoot pin latch may align with a receiver in the inlet which allows the shoot pin to be deployed when the fan cowl panels are closed. The shoot pin must be stowed when opening the fan cowl panels, which causes the handle (which ideally will be a high visibility handle) to be extended from the cowl which further helps signal that the cowl is open and not latched.

Figure 1:
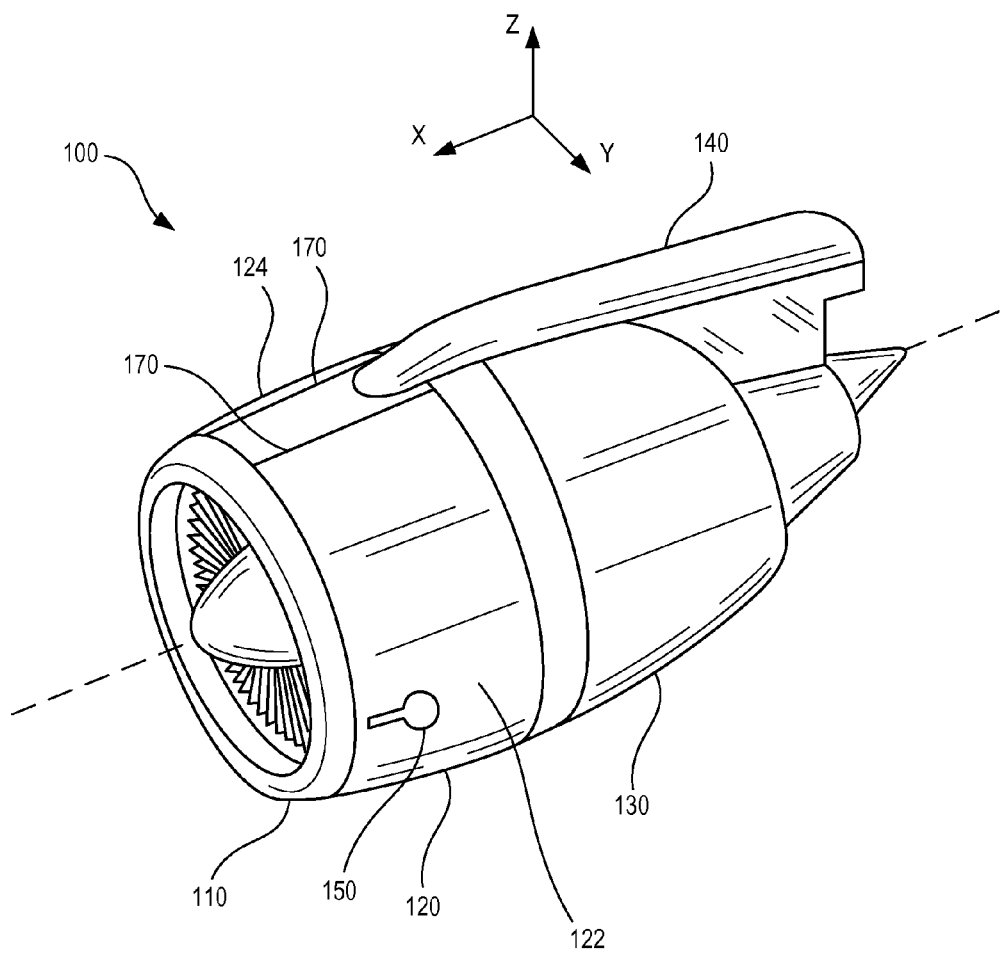
FIG. 1 illustrates a perspective view of a nacelle in accordance with various embodiments of the disclosure.

Referring to FIG. 1, a nacelle 100 for a gas turbine engine is illustrated according to various embodiments. X-y-z axes are shown for ease of illustration. As used herein, the term forward represents the positive x-direction, the term rear or aft represents the negative x-direction, the term left represents the positive y-direction, the term right represents the negative y-direction, the term down represents the negative z-direction, and the term up represents the positive z-direction. Nacelle 100 may comprise an inlet 110, a fan cowl 120, and a thrust reverser 130. Nacelle 100 may be coupled to a pylon 140, which may mount the nacelle 100 to an aircraft wing or aircraft body.

The fan cowl 120 may comprise a left fan cowl panel 122 and a right fan cowl panel 124. The left fan cowl panel 122 and the right fan cowl panel 124 may hinge open at hinges 170. The left fan cowl panel 122 and the right fan cowl panel 124 may hinge open at hinges 170 in order to provide access to the fan case for inspection or servicing. The left fan cowl panel 122 and the right fan cowl panel 124 may together help form the exterior of the nacelle 100 when the left fan cowl panel 122 and the right fan cowl panel 124 are closed. The left fan cowl panel 122 and the right fan cowl panel 124 may be latched together at the bottom of the nacelle 100 where the left fan cowl panel 122 and the right fan cowl panel 124 meet. A shoot pin latch 150 may be located on an outboard portion of the fan cowl 120 for example at the 3 o'clock and/or the 9 o'clock positions. The shoot pin latch 150 may be prevented from engaging a receiver on the inlet if the fan cowl panels 122, 124 are not latched together. The shoot pin latch 150 may provide a visual indication that the fan cowl panels 122, 124 are not latched together.

Figure 2:
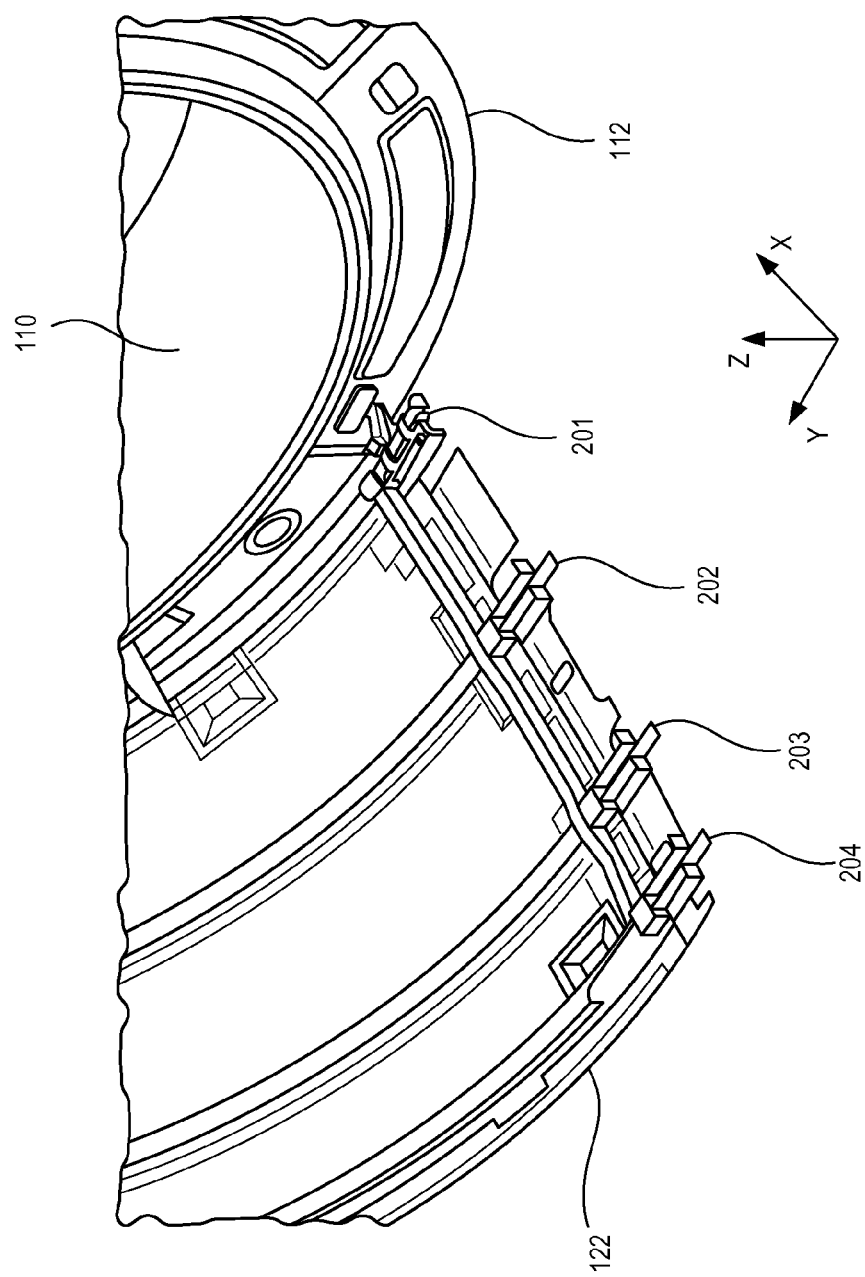
FIG. 2 illustrates an interior view of a left fan cowl panel in accordance with various embodiments of the disclosure.

Referring to FIG. 2, a perspective view of the interior of a left fan cowl panel 122 is illustrated according to various embodiments. The left fan cowl panel 122 is located aft of the inlet 110 and adjacent to an aft inlet bulkhead 112. The right fan cowl panel is not shown in FIG. 2 for ease of illustration. The left fan cowl panel 122 may be coupled to the right fan cowl 124 panel by a series of latches. A number one latch 201 may be the most forward latch. A number two latch 202, a number three latch 203, and a number four latch 204 may be located aft of the number one latch 201. Maintenance personnel may be trained to close the latches sequentially, starting with the number one latch 201, followed by the number two latch 202, the number three latch 203, and the number four latch 204. The latches may be opened in the opposite order, starting with the number four latch 204, followed by the number three latch 203, the number two latch 202, and the number one latch 201.

The number one latch 201 may be configured to create a separation between the left fan cowl panel 122 and the right fan cowl panel 124 in response to being unlatched. Thus, the number two latch 202, the number three latch 203, and the number four latch 204 may not be latched while the number one latch 201 is unlatched and the left and right panels 122, 124 are separated. Similarly, the number one latch 201 may not be unlatched while the number two latch 202, the number three latch 203, or the number four latch 204 are latched. The separation created by the unlatched number one latch 201 may be easily visible to maintenance personnel, both in the area of the latches at the bottom of the fan cowl panels 122, 124, as well as circumferentially about the nacelle at the interface between the fan cowl and the inlet and at the interface between the fan cowl and the thrust reverser. Thus, it would be even more apparent to maintenance personnel that a fan cowl panel is not latched, and the fan cowl panels should be latched before flight.

Figure 3:
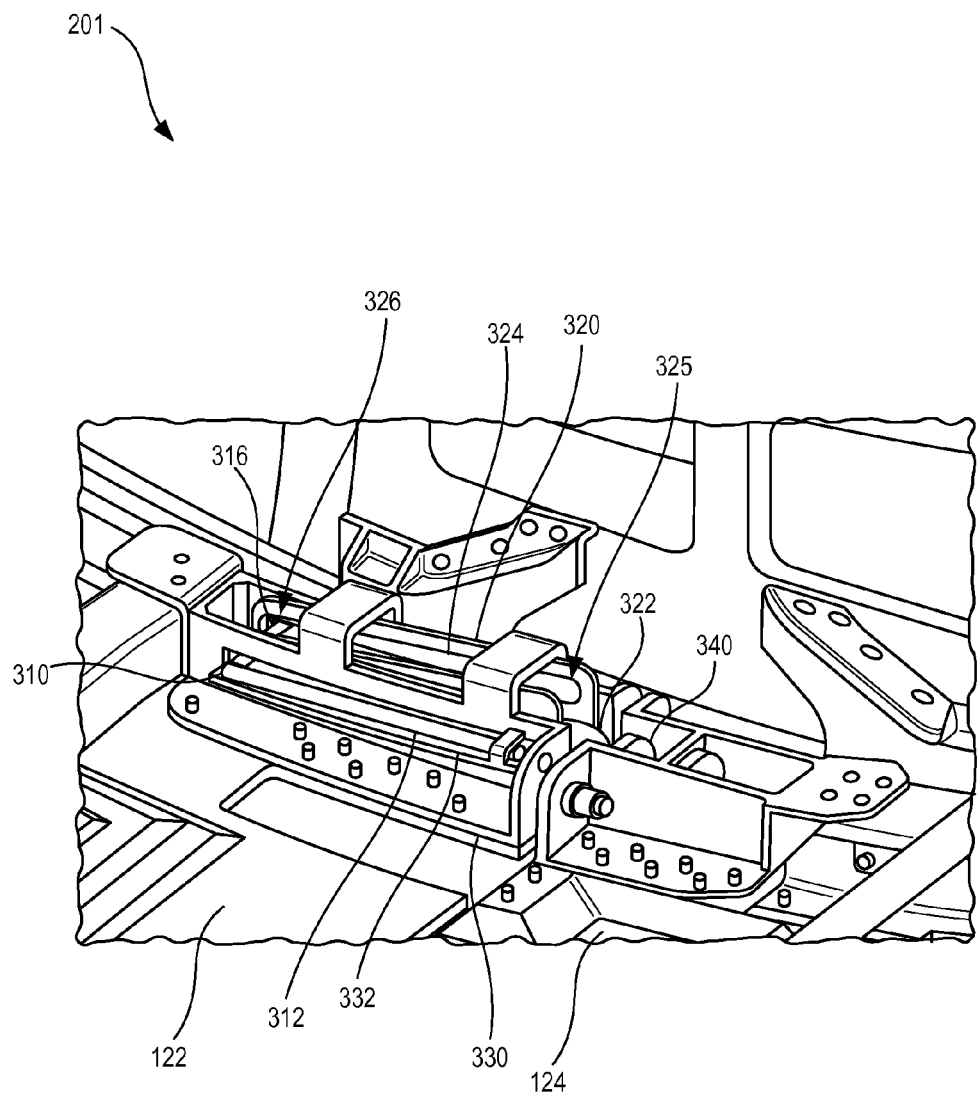
FIG. 3 illustrates a perspective view of a latch with a push pin in accordance with various embodiments of the disclosure.
Figure 4:
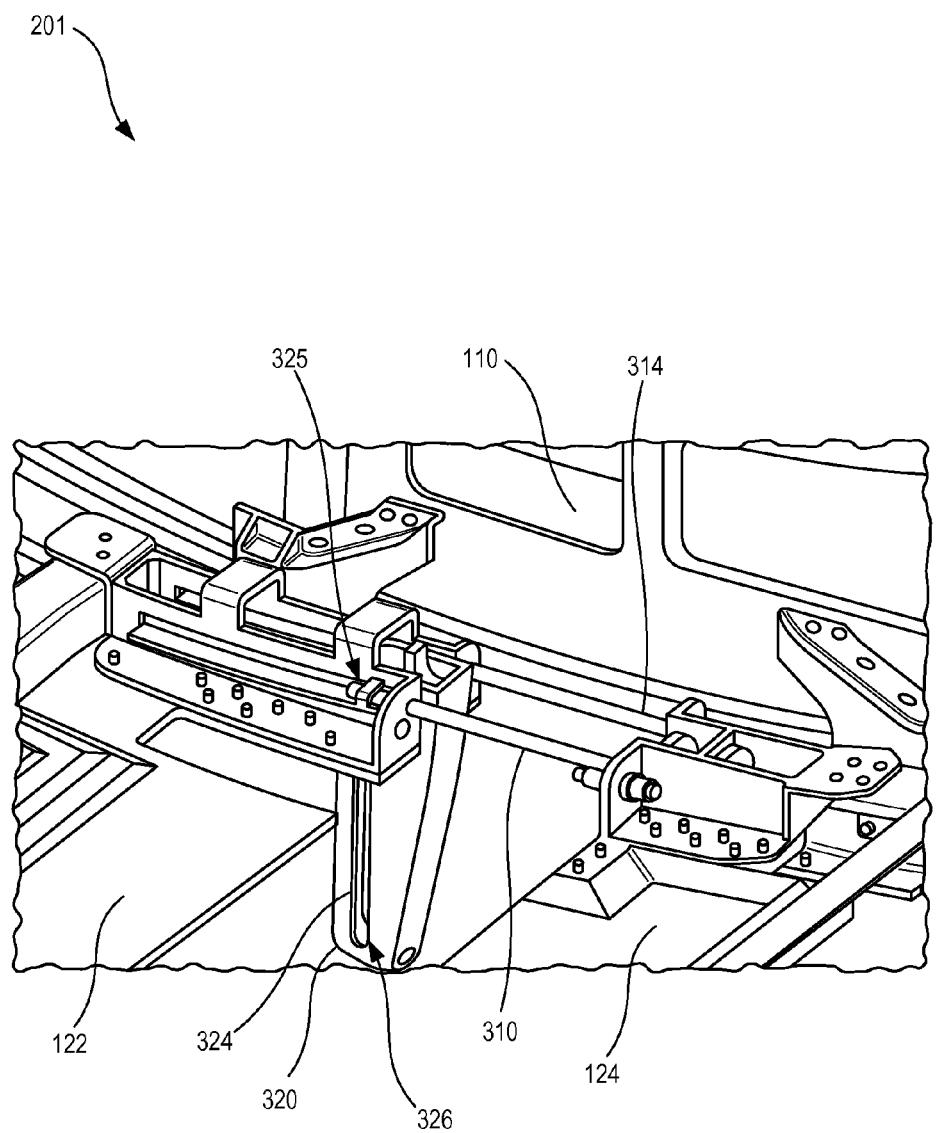
FIG. 4 illustrates a perspective view of a latch in an unlatched position in accordance with various embodiments of the disclosure.

Referring to FIG. 3, a perspective view of a number one latch 201 comprising a push pin 310 is illustrated in the latched position according to various embodiments. Those skilled in the art will recognize that many types of latches may create a separation between fan cowl panels, and the latches described with respect to FIGS. 3-4 are merely an example of latches which may create a separation between fan cowl panels. The number one latch 201 may comprise a handle 320 located within a latch housing 330 coupled to the left fan cowl panel 122. The handle 320 may comprise a hook 322. The hook 322 may engage a keeper 340 coupled to the right fan cowl panel 124. Contact and tension between the hook 322 and the keeper 340 prevents the left fan cowl panel 122 and the right fan cowl panel 124 from separating.

The number one latch 201 may comprise a push pin 310. The push pin 310 may comprise a first push rod 312 and a second push rod 314 (shown in FIG. 4), although use of only one push rod or more than two may also be possible. The first push rod 312 and the second push rod 314 may be connected by an axial rod 316. The axial rod 316 may extend through a slot 324 in the handle. The axial rod 316 may also extend through a guide 332 in the latch housing 330, which may prevent the push pin 310 from rotating with the handle 320. The slot 324 may comprise a proximal end 325 and a distal end 326. In the latched position, the axial rod 316 may extend through the distal end 326 of the slot 324. In response to the handle 320 being pivoted in a counter-clockwise direction (looking from aft to forward), the slot 324 in the handle 320 may contact the axial rod 316 and may force the push pin 310 toward the right fan cowl panel 124. The push pin 310 may contact the right fan cowl panel 124 and separate the right fan cowl panel 124 from the left fan cowl panel 122. The axial rod 316 may slide through the slot 324 until the handle 320 is fully rotated, at which point the axial rod 316 may extend through the proximal end 325 of the slot. With this specific configuration, the push pin 310 is always retracted when the number one latch 201 is closed and always extended when the number one latch 201 is open, with the pivoting movement of the handle 320 directly or indirectly driving the extension and retraction motion of the push pin 310. This configuration is not required in all implementations. It may be desirable, and those of ordinarily skill in this art would be able to provide a lost motion device, such as a spring, between the handle 320 and the push pin 310 in certain implementations. When they are linked without lost motion, then it requires and ensures the number one latch 201 to be opened only after the other latches are first unlatched, and the number one latch 201 to close before the other latches are closed, which is the preferred order for the latching system, which is advantageous. Also, with this configuration there is no possibility that the fan cowl panels 122, 124 could be pushed together to obscure the gap between them when the number one latch 201 is unlatched.

Referring to FIG. 4, a perspective view of the number one latch 201 in an unlatched position is illustrated according to various embodiments. The axial rod 316 may be located within the proximal end 325 of the slot 324 in the handle 320. The push pin 310 may contact the right fan cowl panel 124 and separate the right fan cowl panel 124 and the left fan cowl panel 122. The weight of the right fan cowl panel 124 may exert a force on the push pin 310, which in turn exerts a force on the handle 320. However, the force may be exerted on the handle 320 at the proximal end 325 of the slot 324 in the handle 320. The proximal end 325 of the slot 324 may be located in line with the pivot point of the handle 320.

Thus, the weight of the right fan cowl panel 124 may not create a torque on the handle 320. Therefore, the weight of the right fan cowl panel 124 will not cause the handle 320 to close. The number one latch 201 may maintain a separation between the left fan cowl panel 122 and the right fan cowl panel 124 until the handle 320 is rotated in the clockwise direction by maintenance personnel.

Figure 5:
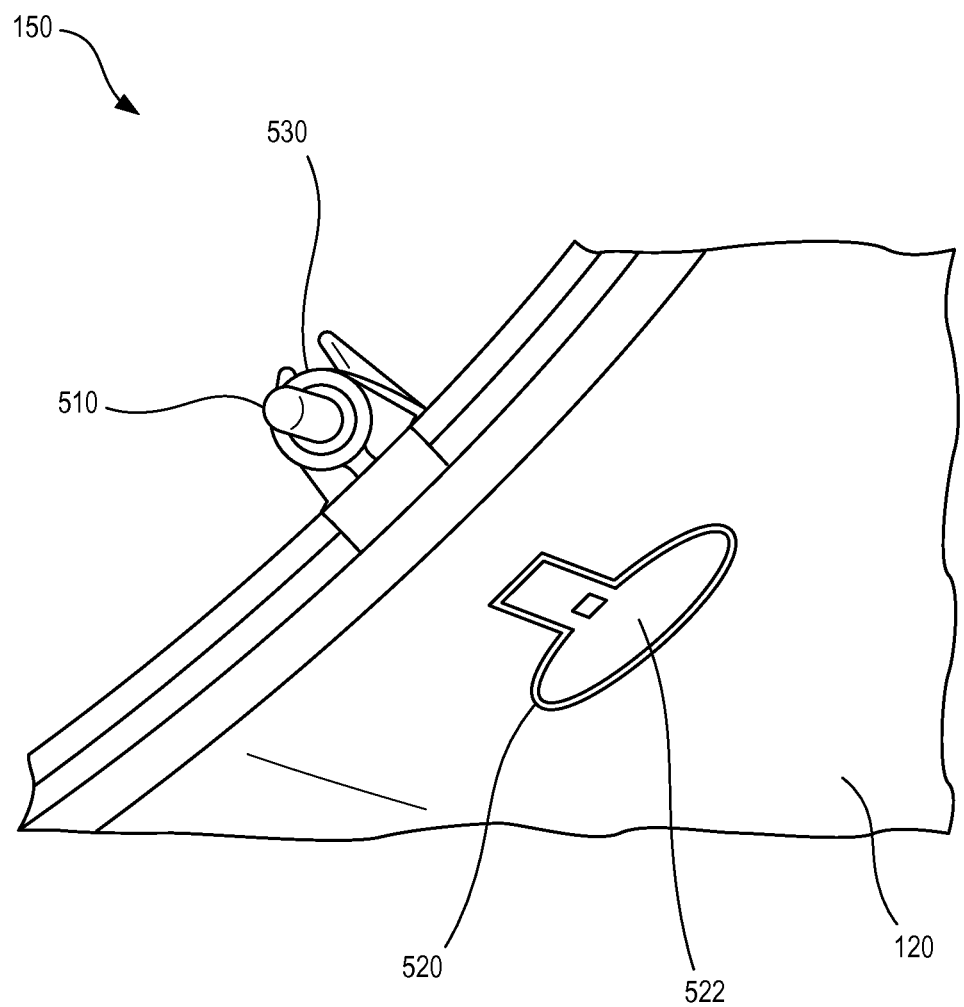
FIG. 5 illustrates a shoot pin latch with the shoot pin deployed in accordance with various embodiments of the disclosure.

Referring to FIG. 5, a shoot pin latch 150 with the shoot pin 510 deployed is illustrated according to various embodiments. The shoot pin latch 150 may comprise a high visibility handle 520. The high visibility handle 520 may be located on an outboard portion of the fan cowl 120. As opposed to the latches which couple the fan cowl panels together, which may be located as low as 18" from the ground, the high visibility handle 520 may be closer to eye level of maintenance personnel on the ground. Furthermore, the high visibility handle 520 may comprise a paddle 522 or other large, conspicuous shape. Additionally, the high visibility handle 520 may comprise a bright color which is distinguishable from the fan cowl 120. Thus, the high visibility handle 520 may be more likely to be noticed when disengaged than the latches which latch the fan cowl panels together.

The shoot pin latch may comprise a shoot pin 510. When the high visibility handle 520 is in the engaged, or closed position, such that the high visibility handle 520 is flush with the fan cowl 120, the shoot pin 510 may extend forward of a shoot pin housing 530. The shoot pin 510 may be aligned with and inserted within a shoot pin receiver coupled to the inlet, as further described with reference to FIG. 7. Alternatively, the shoot pin receiver could be mounted to other nacelle structure such as the thrust reverser if the shoot pin latch is located at the aft end of the fan cowl. When the shoot pin 510 is located within the shoot pin receiver, the fan cowl panels may be prevented from opening.

Figure 6:
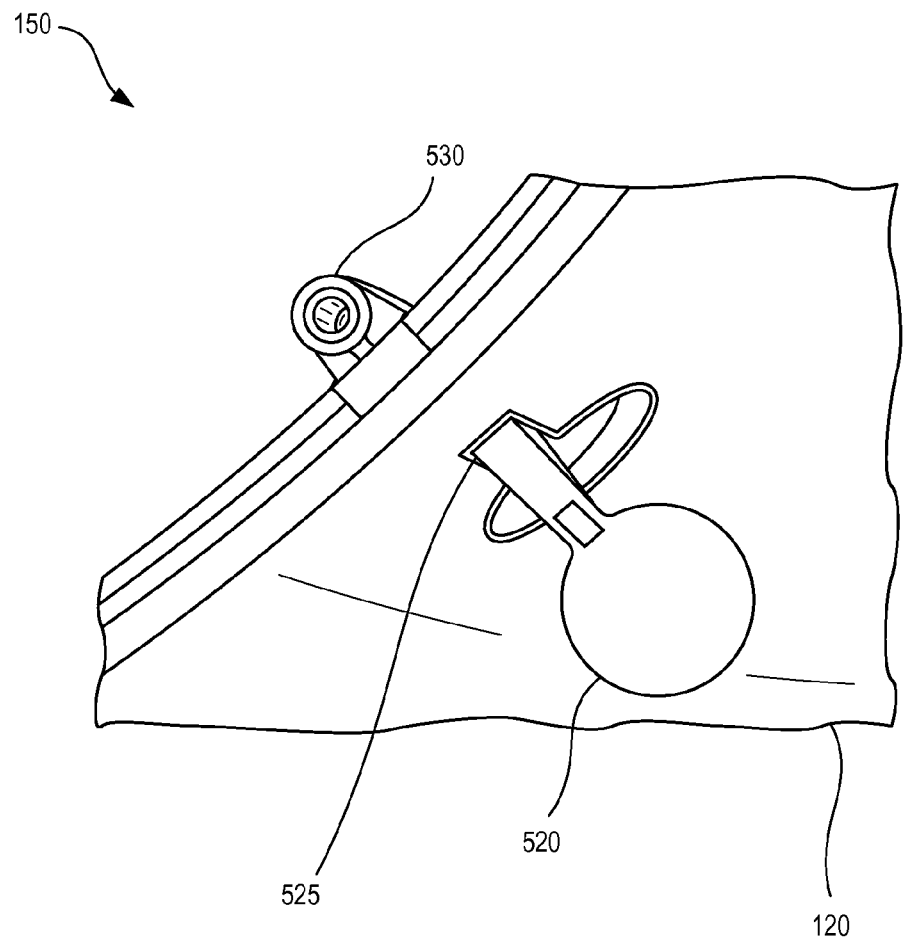
FIG. 6 illustrates a shoot pin latch with the shoot pin stowed in accordance with various embodiments.

Referring to FIG. 6, the shoot pin latch 150 is illustrated with the shoot pin retracted according to various embodiments. The high visibility handle 520 may be pulled and rotated at a pivot 525 to disengage, or open the shoot pin latch 150. In response to the high visibility handle 520 being rotated, the shoot pin may retract within the shoot pin housing 530 and disengage from the shoot pin receiver. The high visibility handle 520 is extended away from the fan cowl 120, providing a visual indication that the shoot pin latch 150 is not engaged, and that the fan cowl panels may or may not be latched together.

Figure 7:
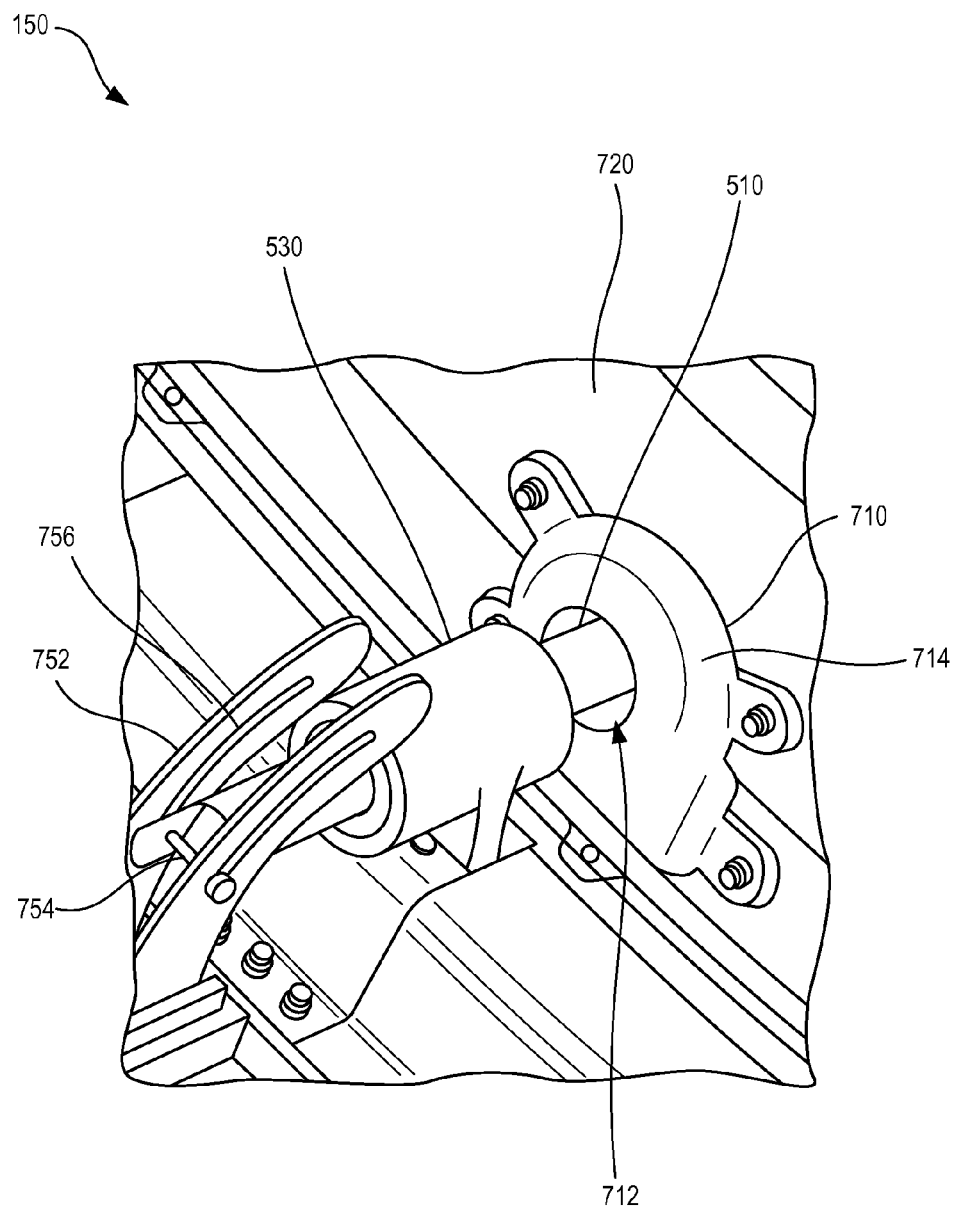
FIG. 7 illustrates a shoot pin latch with the shoot pin deployed in a receiver in accordance with various embodiments.

Referring to FIG. 7, the shoot pin 510 is illustrated inserted in a receiver cavity 712 according to various embodiments. A receiver 710 may be coupled to the inlet aft bulkhead 720. The receiver 710 may comprise a receiver body 714 and a receiver cavity 712 configured to receive the shoot pin 510. The shoot pin latch 150 may comprise one or more curved arms 752 coupled to the high visibility handle. A retaining pin 754 may extend through slots 756 in the curved arms 752. The retaining pin 754 may couple the shoot pin 510 to the curved arms 752. As the high visibility handle is pivoted open, the curved arms 752 may retract the shoot pin 510 out the receiver cavity 712 and into the shoot pin housing 530. The retaining pin 754 may slide through the slots 756 as the curved arms 752 retract the retaining pin 754.

The shoot pin 510 and the receiver cavity 712 may be aligned when the fan cowl panels are closed. However, if the fan cowl panels are not fully closed, such as if the push pin latch described with reference to FIGS. 2-4 is maintaining a gap between the fan cowl panels, the shoot pin 510 may not align with the receiver cavity 712. In the event that one attempts to close the high visibility handle without the fan cowl panels fully closed, the shoot pin 510 may contact the receiver body 714 and prevent the high visibility handle from fully closing. The high visibility handle will be prevented from fully closing unless the fan cowl panels are fully closed which aligns the shoot pin 510 with the receiver cavity 712. When the fan cowl panels are more fully open, the shoot pin latch 150 may be closed and the shoot pin 510 extended, but the shoot pin 510 in that position would help maintain the gap between the fan cowl panel and the inlet, and the shoot pin latch 150 would require opening again during the closing operation in order to clear the receiver body 714. Thus, when the fan cowl panels are not fully closed, the shoot pin latch 150 will either, depending upon the extent of the open position of the panels, help maintain the gap between the inlet and the fan cowl panels or cannot be in the latched position and will maintain the latch handle extended and visible. Either condition helps indicate in a visible way that the fan cowl panels are not fully closed.

As an additional function and advantage, the shoot pin 510 and the receiver 710 may prevent relative movement between the fan cowl panels and the inlet during flight. Thus, the shoot pin latch 150 may decrease deflections in the fan cowl during flight and may decrease the amount of scooping that occurs, in which bypass air enters the interior of the nacelle and can result in an increase in drag or departure of the fan cowl panels from the nacelle.

Although the latching mechanisms are described as latching two fan cowl panels together, it could also be readily adapted as a latching mechanism which extends between an inner fixed structure (IFS) half and the engine, or between the two (left and right) IFS halves, or at any other nacelle location which utilizes latches. Similarly, a high visibility latch handle may be mounted to the inlet or thrust reverser, and the receiver may be mounted to the fan cowl panels.

Although illustrated with the push pin 310 contacting the right fan cowl panel 124 in FIGS. 2-4, those skilled in the art will recognize that the number one latch 201 may be oriented in the reverse direction, such that the push pin 310 contacts the left fan cowl panel 122. Similarly, those skilled in the art will recognize that the push pin 310 could engage structure on the inlet 110 instead of engaging structure on the opposite fan cowl panel. In addition, those skilled in the art will recognize that a latch having a push pin may be utilized in any fan cowl latch and not only the number one latch. However, the order of latching and unlatching may be changed such that the latch with the push pin is latched first and unlatched last.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft nacelle having a longitudinal axis running in a fore direction and an aft direction comprising:
   a first fan cowl panel rotatable about a first hinge and a second fan cowl panel rotatable about a second hinge, wherein the first fan cowl panel and the second fan cowl panel are rotatable between a closed position in which the first fan cowl panel and the second fan cowl panel form an exterior of the aircraft nacelle, and an open position in which the first fan cowl panel and the second fan cowl panel are separated;
   a shoot pin latch mounted to the first fan cowl panel, the shoot pin latch comprising a first handle and a shoot pin, the shoot pin oriented to translate in the fore direction and the aft direction;
   and a receiver coupled to an inlet bulkhead of the aircraft nacelle, the receiver having a receiver cavity longitudinally aligned to receive the shoot pin;
   wherein, in the closed position, the shoot pin is aligned with the receiver cavity in the receiver, and wherein the shoot pin latch is configured to be closed by extending the shoot pin in the fore direction into the receiver cavity.

2. The aircraft nacelle of claim 1, wherein the first handle is located at an outboard portion of the first fan cowl panel.

3. The aircraft nacelle of claim 1, wherein, in the open position, the shoot pin is not aligned with the receiver cavity.

4. The aircraft nacelle of claim 1, further comprising a latching mechanism configured to prevent the first fan cowl panel from separating from the second fan cowl panel, wherein the latching mechanism comprises a second handle comprising a slot, and a push pin located at least partially within the slot.

5. The aircraft nacelle of claim 1, wherein the shoot pin latch comprises a curved arm coupled to the first handle.

6. The aircraft nacelle of claim 5, wherein the curved arm comprises a groove.

7. The aircraft nacelle of claim 1, wherein a latching mechanism is configured to maintain a separation between the first fan cowl panel and the second fan cowl panel in response to the latching mechanism being in an unlatched position.

8. The aircraft nacelle of claim 7, wherein the separation prevents the shoot pin from being inserted in the receiver cavity.

9. An aircraft nacelle having a longitudinal axis running in a fore direction and an aft direction comprising:
   a first fan cowl panel configured to move relative to the aircraft nacelle to provide access to a fan case;
   a latch configured to create a separation between the first fan cowl panel and a second fan cowl panel in response to the latch being unlatched;
   a shoot pin latch coupled to the first fan cowl panel, wherein the shoot pin latch is configured to be closed by extending a shoot pin, oriented to translate in the fore direction and the aft direction, in the fore direction; and
   a receiver coupled to an inlet bulkhead of the aircraft nacelle, the receiver having a receiver cavity longitudinally aligned to receive the shoot pin.

10. The aircraft nacelle of claim 9, wherein the shoot pin latch comprises a handle.

11. The aircraft nacelle of claim 9, wherein the shoot pin is configured to contact a body of the receiver in response to the latch being unlatched.

12. The aircraft nacelle of claim 10, wherein the handle is a high visibility handle.

13. The aircraft nacelle of claim 10, wherein the handle is located at an outboard portion of the aircraft nacelle.

14. The aircraft nacelle of claim 9, wherein the shoot pin latch comprises a curved arm coupled to a handle, and a retaining pin coupling the shoot pin to the curved arm.

15. The aircraft nacelle of claim 14, wherein the retaining pin is slidable within a groove in the curved arm.

16. The aircraft nacelle of claim 1, wherein in the closed position, the shoot pin is configured to prevent the first fan cowl panel from rotating about the first hinge.

* * * * *